Figure 1:
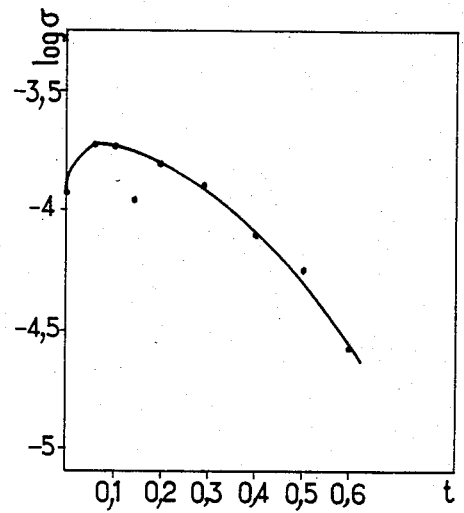

United States Patent [19]

Carette et al.

[11] Patent Number: 4,513,070
[45] Date of Patent: Apr. 23, 1985

[54] VITREOUS MATERIALS WITH IONIC CONDUCTIVITY, THE PREPARATION OF SAME AND THE ELECTROCHEMICAL APPLICATIONS THEREOF

[75] Inventors: Brigitte Carette, Paris; Ali Kone, Abidjan; Jean-Louis Souquet, Grenoble; Michel Ribes, Clapiers; Maurice Maurin, Montpellier, all of France

[73] Assignee: Centre National de la Recherche Scientifique, France

[21] Appl. No.: 465,030

[22] Filed: Feb. 8, 1983

[30] Foreign Application Priority Data

Feb. 9, 1982 [FR] France ................................ 82 02083

[51] Int. Cl.³ .................... H01M 6/18; C03C 3/04; C03C 3/12; C03C 3/16
[52] U.S. Cl. .................................. 429/193; 65/17; 65/66; 429/191; 501/40; 501/41; 501/42; 501/43; 501/44; 501/45; 501/49; 501/55; 501/56; 501/57; 501/73
[58] Field of Search ............... 429/191, 192, 193; 501/40, 41, 42, 43, 44, 45, 49, 55, 56, 57, 73; 65/17, 66

[56] References Cited

U.S. PATENT DOCUMENTS 3,911,085 10/1975 Bither et al. ................... 429/191 X
4,331,750 5/1982 Malugani et al. ................... 429/193

FOREIGN PATENT DOCUMENTS 108104 8/1980 Japan ..................................... 501/42
109378 8/1980 Japan ..................................... 429/191

OTHER PUBLICATIONS

Tsutomu Minami et al., Revue de Chimie Minérale, t. 16, p. 283, 20, (1979).

*Primary Examiner*—G. L. Kaplan
*Attorney, Agent, or Firm*—Larson and Taylor

[57] ABSTRACT

Electrochemical devices use a vitreous material having a general formula $$xAaR_b-yNmRc-zN_nY_p$$

wherein A is Si, Ge, P, S, B, Nb, As, V, Cr or Mo; R is O, S or Se; N is Li, Na, K or Ag and Y is I, Br, Cl, F, $ClO_4$, $CF_3$, $SO_3$, SCN or $SO_4$ with the proviso that the material contain at least two salts NY. Such materials have increased cationic conductivity.

13 Claims, 2 Drawing Figures

VITREOUS MATERIALS WITH IONIC CONDUCTIVITY, THE PREPARATION OF SAME AND THE ELECTROCHEMICAL APPLICATIONS THEREOF

The invention relates to novel vitreous materials having ionic conductivity and the preparation thereof.

It also relates to the electrochemical applications of these materials, more especially as electrolytes.

Generally, vitreous materials result from the reaction of a system called lattice former and a system called lattice modifier.

The lattice modifier introduces ionic bonds responsible for the conductivity observed in these materials.

It is recognized that it is a question of a purely cationic conductivity. At a temperature less than the vitreous transition temperature, the anionic lattice appears in fact frozen.

The most widely studied vitreous materials of this type are formed by oxide based glasses. The conductivity of these glasses is low at room temperature, i.e. of the order of $10^{-7}$ to $10^{-8} \Omega^{-1} cm^{-1}$, which does not allow use thereof to be contemplated at high temperatures close to 300° C. and in the form of thin layers.

So as to obtain vitreous materials having a higher conductivity, introduction of more polarizable atoms into the lattice has been proposed. Thus, the substitution of oxygen by sulphur allows the electric conductivity to be increased by a factor 10.

To improve the conductivity, it has also been proposed to dissolve in the glass, i.e. the former-modifier system, a salt of the cation responsible for the conductivity.

This salt, called doping salt, by dissociating, allows the number of mobile cations to be increased and is thus capable of increasing the cationic conductivity of the whole of the material.

But, the amount of doping salt which can be added and, consequently, the increase in conductivity which may result therefrom are limited by the appearance of heterogeneities due to partial recrystallization of the glass.

The study of this problem by the inventors has enabled them to establish the fact that it was possible to further improve the effects obtained up to then by doping. Thus, it has proved surprisingly that the use of the doping principle, but under certain conditions and in particular with certain types of dopes, has allowed materials of high conductivity to be obtained in a particularly advantageous temperature range for numerous industrial applications, namely from about −20° C. to about +100° C. and, more particularly, for a large number of them, at room temperature or at lower temperatures.

The invention therefore has as its aim to provide new vitreous materials with a doped glass basis having a conductivity usable industrially in a range of temperatures of the order of −20° C. to about +100° C.

It also has as its aim to provide a process for easily obtaining the materials of the invention, usable on an industrial scale.

It further aims at providing materials usable because of their high electric conductivity in numerous electrochemical devices.

The vitreous materials of the invention with doped glass basis comprising a lattice former system and a modifier system, are characterized in that they are materials comprising at least two doping salts and corresponding to the general formula I:

$$xF_o - yM - zD \qquad (I)$$

in which:

F$_o$ represents the lattice former system and comprises a compound of type $A_aR_b$, or several compounds of this type different from each other, A being chosen from Si, Ge, P, B, S, Nb, As, V, Cr, Mo and R from O, S, Se, M represents the lattice modifier system of type $N_mR_c$, N being chosen from Li, Na, K, Ag and R having, independently, one of the meanings given above for the lattice former compounds, D represents at least two doping salts of type $N_nY_p$, the meaning of N in the group NY being for each salt identical to that of N in the group NR, Y having in each of these salts different meanings chosen from I, Br, Cl, F, ClO$_4$, CF$_3$SO$_3$, SCN, SO$_4$;

a, b; m, c and n,p represent the indices corresponding to the stoichiometry of the constituents in a given group and x, y and z, whose sum is equal to 1, represent the indices corresponding to the overall molar fractions respectively of the compound or compounds forming the former system, the modifier system and the doping salt of the material, the values of these indices being compatible with the vitreous range of a given material, the elements A, R and Y being such that the materials have a conductivity of at least $10^{-4} \Omega^{-1} cm^{-1}$ at room temperature when N represents Ag and a conductivity of at least $10^{-8} \Omega^{-1} cm^{-1}$ at room temperature when N represents an alkali metal, in particular Li and with the proviso that F$_o$ does not represent a B$_2$O$_3$ or B$_2$O$_3$-SiO$_2$ former system and M a Li$_2$O modifier system when D is a composite (LiCl)$_2$ and Li$_2$SO$_4$ salt.

It will be observed that the materials of the invention are doped with at least two salts, these salts comprising the same cation, namely the cation corresponding to that of the modifier compound, the anions of these salts being different from each other.

Surprisingly, such doping leads to an increase in conductivity greater than that resulting from the dissolution of the same quantity, as a molar fraction, of a single salt and allows materials to be obtained having a conductivity usable at temperatures of the order of −20° C. to +100° C., which is of great interest for numerous industrial applications.

A preferred family of the doped products of the invention comprises materials' in which D represents more than two doping salts, in particular three doping salts.

In another preferred family, D represents two doping salts.

A preferred group in each of these families comprises the materials in which F$_o$ comprises two former compounds in respective proportions x$_1$ and x$_2$ whose values correspond to the definition given above for x.

In another preferred group of each of these two families, F$_o$ is formed by a single lattice former compound, in accordance with the above defined proportions x.

Preferred vitreous materials of the above groups comprise oxide based glasses, i.e. in which R represents O.

Corresponding advantageous compounds comprise as former oxide and modifier oxide, systems of the type $SiO_2$—$Li_2O$ (or $Na_2O$, $K_2O$ or $Ag_2O$), $B_2O_3$—$Na_2O$ (or $K_2O$ or $Ag_2O$), $P_2O_5$—$Li_2O$ (or $Na_2O$, $K_2O$ or $Ag_2O$), or $As_2O_3$—$Li_2O$ (or $Na_2O$, $K_2O$ or $Ag_2O$).

Other preferred vitreous materials comprise sulphur or selenium based glasses.

Compositions of this type more particularly suitable for implementing the invention contain Si, Ge or P as element A in the former system and Li, Na or Ag as element N.

Preferred modifier systems and former systems correspond respectively then to $SiS_2$, $GeS_2$ or $P_2S_5$ and to $Li_2S$, $Na_2S$ or $Ag_2S$.

Preferably, in these different types of materials, R represents a cation with high mobility such as Ag.

Materials which are also advantageous contain a cation such as Li advantageous from the point of view of its lightness.

The two anions of the doping salts are formed, in a group of materials of the invention, by a halide.

In another group, one at least of these anions may be a perchlorate or a trifluoromethyl group. In yet another group, one at least of the anions is chosen from a sulphured group, particularly $SO_3$, $SO_4$ or else SCN.

The values of the indices x, y and z depend on the extent of the vitrification range of a given vitreous material and are easily determined experimentally for example by X ray diffraction.

Experience also allows the optimum value of these indices to be determined in each case with respect to the cationic conductivity. In this respect, it has been verified that the maximum conductivity moves in the direction of the salt having the highest dissociation constant.

The invention also relates to a process for manufacturing the above defined doped materials.

In this process there are simultaneously dissolved, in a vitreous material formed of a lattice former compound and a lattice modifier compound, two or more doping salts in proportions compatibile with the vitreous range of the glass considered, by operating sheltered from the air, when R=S, Se, more especially in a vacuum, at a temperature more particularly of the order of 700° to 1000° C., sufficient for obtaining the fusion of the glass and of the doping salts and the desired dissolution.

As was pointed out above, the study by the inventors of the doping of vitreous materials has brought out an unexpected effect, at the level of the conductivity properties of the basic glass, resulting from the dissolution of two or more doping salts.

Particularly advantageously, an increase in conductivity has in fact been observed greater than that resulting from the dissolution of the same quantity, as molar fraction, of a single salt.

The study of the above materials has shown that they have remarkable conductivity properties in a temperature range going from about $-20°$ C. to $+100°$ C. These materials provide an exclusively cationic conduction. Advantageously, their redox stability range seems very wide and their chemical stability (more especially with respect to metal lithium) appears satisfactory, more especially at room temperature.

These materials prove then to be appropriate in numerous electrochemical applications, more especially as solid electrolytes in high energy density electrochemical storage systems.

The invention also relates to the electrochemical applications of these materials and the all solid electrochemical devices comprising them as electrolytes.

These electrolytes may be used in solid mass form or in the form of crushing then compacted glass or else in a thin film form.

Figure 2:
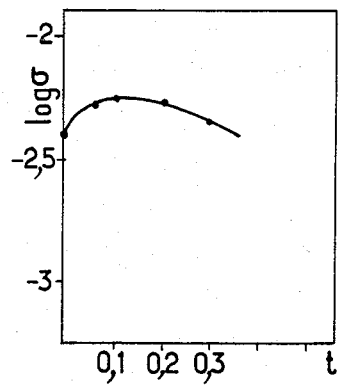

Other characteristics and advantages of the invention will appear in the following examples with reference to the drawings in which:

FIGS. 1 and 2 show the variation of the conductivity (log $\sigma$) at 15° C. of the materials of the invention as a function of their content of a given doping salt. The electrical conductivities reported in these examples, and more generally in the description, are measured by the method of complex impedance (see Ravaine and Souquet in J. Chim.Phys. t. 71, 1974,P 693).

EXAMPLE 1

Preparation of the material of formula $0.36GeS_2$, $0.24Li_2S$, $0.4(0.9LiI, 0.1LiBr)$ In the finely crushed conditions and in proportions for obtaining the above stochiometry, $0.24Li_2S, 0.36GeS_2$ glass is mixed with LiI and LiBr, then the mixture is introduced into a vitreous graphite tube placed in silica ampoules.

These ampoules are then sealed under a secondary vacuum, at a residual pressure of 1.3 to $13 \times 10^{-3}$ Pa.

The mixture is melted by subjecting the ampoules to a temperature of the order of 700° to 800° C. for 2 hours.

Then rapid air quenching is carried out followed by annealing at a temperature less than the vitreous transition temperatures by 20° to 30° C.

The material obtained, corresponding to the above structure, is transparent yellow.

Its ionic conductivity $\sigma$, at 25° C., is $4 \times 10^{-4} \Omega^{-1} cm^{-1}$ whereas that of the $0.24Li_2S$, $0.36GeS_2$, 0.4LiI glass is $10^{-4} \Omega^{-1} cm^{-1}$. In FIG. 1 there has been shown the evolution of the electric conductivity at 25° C. as a function of the LiBr content for a glass corresponding then to the $0.24Li_2S$—$0.36GeS_2$—$0.4(t\ LiBr-(1-t)LiI)$ type where t represents the molar fraction of LiBr.

From an examination of this figure, it can be seen that the conductivity passes through a slightly emphasized maximum. From experience then, for each case, the composition having the maximum conductivity at a given temperature may be determined. In the case considered, the maximum in question corresponds to the composition given in the title of the example, that is to say a composition close to 0.1 as a molar fraction of LiBr for the mixture of the two salts LiBr and LiI. Since the dissociation constant of LiI is greater than that of LiBr, it has then been verified that the maximum conductivity moves in the direction of the salt having the highest dissociation constant.

EXAMPLE 2

Preparation of the material of formula $0.3GeS_2$; $0.3GeS_2, 0.3Ag_2S, 0.4(0.9AgI, 0.1AgBr)$ The operating method is as for example 1, but fusion is carried out at 1000° C. for 1 hour and annealing at 200° C.

The material obtained, reddish brown in colour, corresponds to the above structure. Its ionic conductivity $\sigma$ is $9.3 \cdot 10^{-4} \Omega^{-1} cm^{-1}$ at $-23°$ C. and appears then practically twice greater than that of the glass of the same composition doped solely with AgI which is 4.4 $10^{-4}\Omega^{-1}cm^{-1}$ at $-23°$ C.

FIG. 2 shows the evolution of the electric conductivity at 25° C., as a function of the AgBr content of the $0.3Ag_2S—0.3GeS_2—0.4(t\ AgBr-(1-t)AgI)$ glass. The maximum conductivity observed corresponds to the composition given in the title.

EXAMPLE 3

Preparation of the material $0.34Ag_2S—0.51GeS_2—(0.023AgBr—0.127AgI)$

The operating method is as for example 2. The material obtained has a conductivity of $6.8\times10^{-5}\Omega^{-1}cm^{-1}$ at $-23°$ C., which corresponds to a value about twice greater than that of the $0.34Ag_2S—0.51GeS_2—0.15AgI$ glass at the same temperature (namely $\sigma-23°$ C. $=3.7\times10^{-5}\Omega^{-1}cm^{-1}$).

EXAMPLE 4

Construction of batteries of the "button battery" type

For forming the electrochemical chain, a lithium or LiAl alloy anode is used, as active cathode mass, titanium sulphur or iron sulphur, mixed with crushed glass and as electrolyte, the doped vitreous material of example 1 or 2. Current densities greater than 100 $\mu A/cm^2$ are obtained.

We claim:

1. A doped vitreous material with a network former system, network modifier system, and a doping system having the general formula I:

$$xFo—yM—zD \qquad (I)$$

in which:
Fo represents the network former system and comprises a compound of the formula $A_aR_b$ or several compounds of said formula different from each other, A being selected from Si, Ge, P, S, B, Nb, As, V, Cr, Mo and R from O, S, Se, A and R further corresponding to chemically compatible elements,
M represents the network modifier system having the formula $N_mR_c$, N being selected from Li, Na, K and Ag and R having, independently, one of the meanings given above for the network former elements,
a b, m and c represent the indices corresponding to the stoichiometry of the constituents in a given group and,
x, y and z, different from 0 and whose sum equals to 1, represent the indices corresponding to the overall molar fractions respectively of the compound or compounds forming the former system, the modifier system and the doping salt of the material, the values of these indices being compatible with the vitreous range of a given material,
d represents the doping system,
wherein D is formed of at least two doping salts, the salt having the highest dissociation constant being partially substituted by an another salt or other salts whose dissociation constant are lower, in an amount giving an increase of conductivity, said doping system having formula $N_nY_p$, the meaning of N in the group NY, being for each salt identical to that of N in the group NR, Y having in each of these salts different meanings selected from I, Br, Cl, F, $ClO_4$, $CF_3$, $SO_3$, SCN, $SO_4$, and n and p represent the indices corresponding to the stoichiometry of the constituents in a given group and
the elements A, R and Y being such that the materials have a conductivity of at least $10^{-4}\Omega^{-1}cm^{-1}$, at room temperature when N represents Ag, and a conductivity of at least $10^{-8}\Omega^{-1}cm^{-1}$ at room temperature when N represents an alkaline metal, and with the proviso that Fo does not represent a $B_2O_3$ or $B_2O_3$-$SiO_2$ former system and M a $Li_2O$ modifier system when D is a composite $(LiCl)_2$ and $Li_2SO_4$ salt.

2. Materials according to claim 1, characterized in that Fo comprises two former compounds, in respective proportions $x_1$ and $x_2$, whose values correspond to the definitions given for x.

3. Materials according to claim 1, wherein Fo represents a single network former compound, in a proportion x defined above.

4. Materials according to claim 3, selected from the group consisting of systems $SiO_2$—$Li_2O$ (or $Na_2O$, $K_2O$, or $Ag_2O$), $B_2O_3$—$Na_2O$ (or $K_2O$ or $Ag_2O$), $P_2O_5$—$Li_2O$ (or $Na_2O$, $K_2O$ or $Ag_2O$), or $As_2O_3$—$Li_2O$ (or $Na_2O$, $K_2O$ or $AG_2O$).

5. Materials according to claim 1, wherein R is O.

6. Materials according to claim 1, wherein R is S or Se.

7. Materials according to claim 6, wherein A represents Si, Ge or P and N represents Li, Na or Ag.

8. The materials according to claim 1, in which N represents Ag or Li.

9. A process for preparing the materials according to claim 1, two or more dopes are dissolved simultaneously in a vitreous material formed of a network former compound and a network modifier compound, in proportions compatible with the vitreous range of the glass considered, while operating sheltered from the air, at a temperature, of the order of 700° to 800° C., sufficient for obtaining fusion of the glass and the dissolution of the doping salts.

10. The vitreous materials according to claim 1, in solid mass form or in crushed then compacted glass form or else in thin film form.

11. Solid electrolytes, characterized in that they comprise a material according to claim 1.

12. Electrochemical devices, comprising an electrolyte according to claim 11.

13. Vitreous materials, selected from the group consisting of $0.36GeS_2$, $0.24Li_2S$, $0.4(0.9LiI, 0.1LiBr)$, $0.3GeS_2$, $0.3Ag_2S$, $0.4(0.9AgI, 0.1AgBr)$ and $0.34Ag_2S—0.51GeS_2—(0.023AgBr—0.127AgI)$.

* * * * *